United States Patent [19]

Steck et al.

[11] Patent Number: 4,781,851
[45] Date of Patent: Nov. 1, 1988

[54] PREPARATION OF FERROMAGNETIC CHROMIUM DIOXIDE

[75] Inventors: Werner Steck, Ludwigshafen; Herbert Haberkorn, Gruenstadt; Laszlo Marosi, Ludwigshafen; Werner Huebner; Helmut Jakusch, both of Frankenthal, all of Fed. Rep. of Germany

[73] Assignee: BASF Aktiengesellschaft, Fed. Rep. of Germany

[21] Appl. No.: 91,306

[22] Filed: Aug. 28, 1987

Related U.S. Application Data

[63] Continuation of Ser. No. 915,049, Oct. 3, 1986, abandoned.

[30] Foreign Application Priority Data

Oct. 4, 1985 [DE] Fed. Rep. of Germany ....... 3535465

[51] Int. Cl.$^4$ ............................................. C01G 37/027
[52] U.S. Cl. ................................. 252/62.56; 252/62.51
[58] Field of Search ........................... 252/62.51, 62.56

[56] References Cited

U.S. PATENT DOCUMENTS

| | | |
|---|---|---|
| 3,512,930 | 5/1970 | Bottjer et al. |
| 3,686,031 | 8/1972 | Balthis. |
| 3,917,716 | 11/1975 | Dezawa et al. ............. 423/607 |
| 4,340,494 | 7/1982 | Ohlinger et al. |
| 4,374,118 | 2/1983 | Basile et al. ............... 252/62.51 |
| 4,670,177 | 6/1987 | Ohlinger et al. ........... 252/62.51 |

Primary Examiner—Jack Cooper
Attorney, Agent, or Firm—Keil & Weinkauf

[57] ABSTRACT

Ferromagnetic chromium dioxide is improved by subjecting chromium dioxide materials prepared by a known method to an additional heat treatment.

1 Claim, No Drawings

PREPARATION OF FERROMAGNETIC CHROMIUM DIOXIDE

This application is a continuation of application Ser. No. 915,049, filed on Oct. 3, 1986, now abandoned.

The present invention relates to a process for improving ferromagnetic chromium dioxide in respect of its processability in the preparation of magnetic recording media and their magnetic and recording properties.

The preparation of acicular ferromagnetic chromium dioxide and the use of this material for magnetic recording media has frequently been described. Magnetic recording media which contain chromium dioxide generally possess superior magnetic properties compared with recording media based on other magnetic oxides.

However, it is also known that the magnetic properties of recording media containing nonstabilized chromium dioxide deteriorate in the course of time. Ferromagnetic chromium dioxide in powder form is substantially stable in the absence of moisture, and furthermore no change in the magnetic properties can be detected over a long period. However, it has been observed that chromium dioxide is attacked both by water and by other materials, for example the organic polymer binders used in the preparation of magnetic recording media, with decomposition to nonmagnetic components. In the case of magnetic recording media, this not only means a loss in the magnetic propertie and hence in the electroacoustic properties but may also mean a deterioration in the mechanical properties. This deterioration is further accelerated at fairly high temperatures. There has therefore been no lack of attempts to overcome these disadvantages. For example, U.S. Pat. No. 3,512,930 describes the treatment of chromium dioxide powder with a reducing agent, while DE-A No. 23 25 132 states that the action of gaseous reducing agents produces an increase in the Curie point. In other processes, alumina coatings (U.S. Pat. No. 3,687,726) or coatings of sparingly soluble metal phosphates (U.S. Pat. No. 3,686,031) are produced. The application of metal compounds whose cations are capable of forming sparingly soluble chromates has also been disclosed. JA-A No. 21200/76 proposes applying magnetic iron oxides onto the surface in order to coat the chromium dioxide particles, while DE-A No. 27 49 757 describes the application of iron(III)-containing oxidic deposits onto the chromium dioxide.

To prepare high quality magnetic recording media, it is necessary for the chromium dioxide used to possess not only suitable magnetic properties and adequate stability under conditions of high temperature and humidity but also good processibility. This includes easy dispersibility in the organic medium of the layer composition and the possibility of achieving a smooth surface of the magnetic layer directly after application of the chromium dioxide-containing dispersion onto the base, even before additional calendering. A smooth layer surface is important, for example in the case of video tapes, for an advantageous signal-to-noise ratio. Other important parameters for the quality of magnetic recording media are high residual magnetization, a high orientation ratio (in the preferred direction of magnetization), a good signal-to-noise ratio and a high signal to print-through ratio.

It is an object of the present invention to provide a process for improving the performance characteristics of acicular ferromagnetic chromium dioxide, which permits the preparation, in an economic manner, of magnetic recording media possessing a very smooth surface, improved residual magnetization and a better orientation ratio coupled with adequate stability of the tape under conditions of high temperature and humidity.

We have found that this object is achieved, and that chromium dioxide obtained by converting oxides of 3-valent and 6-valent chromium under superatmospheric pressure and at elevated temperatures in the presence of water and a modifier and after-treated in a conventional manner can be improved, according to the invention, if the said chromium dioxide is heated at from 210° to 280° C. in an inert gas atmosphere, with the proviso that the resulting material consists only of the crystalline phases of chromium dioxide and of orthorhombic CrOOH.

For the purposes of the process according to the invention, it has proven advantageous if heating of the chromium dioxide is carried out in a nitrogen atmosphere at from 210° to 280° C., a treatment period of from 30 minutes to 6 hours being adequate.

The chromium dioxide used for the novel process is prepared by known, conventional methods, as described in, for example, EP-B No. 27 640 which corresponds to U.S. Pat. No. 4,340,494. For example, in the present process water is initially taken in a reaction vessel, chromic acid is introduced while stirring, and the modifiers are added (e.g. antimony (III) oxide and iron oxide as described in Example 1 of U.S. Pat. No. 4,340,494). Chromium (III) oxide is then added with further stirring, in the stoichiometric amount required for the synproportionation reaction. Formation of the chromium dioxide occurs during the subsequent treatment of the mixture in a high pressure reactor under from 100 to 700 bar and at from 200° to 600° C. After from 10 to 50 hours, the chromium dioxide is removed mechanically from the reaction vessel. It may be advantegous to subject this chromium dioxide material, prior to the novelheating process, to amecnanical treatment, for example dry milling or wet milling, or to compress it mechanically or disperse it beforehand. In a preferred embodiment, the chromium dioxide, before being heated, is treated in aqueous and/or organic suspension with a reducing agent and then filtered, washed and, if necessary, dried. It is just as advantageous to use a chromium dioxide material which, for example as a result of a reaction with water either in the course of the conventional preparation process or through a separate after-treament, already contains orthorhombic CrOOH on some or all of its surface.

To carry out the novel process, the chromium dioxide which has been prepared as described and, if necessary, treated is heated in an inert gas atmosphere, for example in a stream of nitrogen and/or a noble gas, at from 210° to 280° C. This is carried out in a furnace of conventional design, for example a rotary tube furnace, a fixed-bed furnace or a fluidized-bed furnace, by a continuous or batchwise procedure. Depending on the temperature set in the heating process, times of from 30 minutes to 6 hours are required.

The chromium dioxide treated in this manner exhibits two crystalline phases in the X-ray diffraction spectrum, that of chromium dioxide and that of orthorhombic CrOOH. The peak positions found through analysis of the X-ray diffraction spectra correspond to the interplanar spacings of $CrO_2$ (110) with $3.128 \pm 0.005$ Å and of orthorhombic CrOOH (110) with $3.220 \pm 0.005$ Å.

No further X-ray diffraction lines which may be assigned to either defined or undefined oxidic chromium compouds are detectable.

The process according to the invention gives a chromium dioxide material whose particle structure, consisting of a $CrO_2$ core and an orthorhombic CrOOH shell, achieves the set object of improving important performance characteristics and at the same time providing adequate stability under conditions of high temperature and humidity. This core/shell particle model can be demonstrated, for example, by means of the known technique of secondary ion mass spectroscopy (SIMS), by recording depth profiles. This method of measurement is described, inter alia, in Ullmanns Encyklopädie der technischen Chemie, 4th edition, volume 5, pages 519–576.

The advantageous properties of the chromium dioxides prepared according to the invention become clear when these compounds are used as magnetic material for the preparation of magnetic recording media. Processing is carried out by known methods. To produce the magnetic layer, from 2 to 5 parts by weight of chromium dioxide are processed with one part of a binder or binder mixture and the suitable dispersants, lubricants and other conventional additives in a total amount of not more than 10% by weight, based on the chromium dioxide, to give a dispersion. The dispersion thus obtained is filtered, and applied with a conventional coating machine, for example a knife coater, onto the nonmagnetic base in one or more thin layers, or in a thin layer onto a magnetic recording medium already provided with another magnetic layer. Before the liquid coating mixture is dried at from 50° to 90° C., the chromium dioxide particles are, if necessary, oriented magnetically. For a special surface treatment of the magnetic layer, the coated film webs are passed between heated polished rollers under pressure. Thereafter, the magnetic layers are usually from 1.5 to 12 μm thick.

Suitable binders for the magnetic layers are the known polymer binders, such as vinyl chloride copolymers, acrylate copolymers, polyvinylacetals, such as polyvinylformal or polyvinylbutyral, fairly high molecular weight epoxy resins, polyurethanes and mixtures of these and similar binders. Compounds which have proven advantageous are the elastomeric and virtually completely isocyanatefree linear polyester urethanes which are soluble in a volatile organic solvent, such polyester urethanes being obtainable by reacting a polyester prepared from an aliphatic dicarboxylic acid of 4 to 6 carbon atoms, such as adipic acid, and one or more aliphatic diols of 3 to 10 carbon atoms, such as 1,2- or 1,3-propylene glycol, butane-1,4-diol, diethylene glycol, neopentylglycol or octane-1,8-diol, with a diisocyanate of 6 to 24, in particular 8 to 20, carbon atoms, such as toluylene diisocyanate or 4,4'-diisocyanatodiphenylmethane, preferably in the presence of a small amount of a glycol of 4 to 10 carbon atoms, such as butane-1,4-diol, which produces chain extension. Polyester urethanes obtained from adipic acid, butane-1,4-diol and 4,4'-diisocyanatodiphenylmethane are preferred. Preferred polyester urethanes have a Shore A hardness of from 70 to 100, a strength of from 400 to 420 kp/cm$^2$ and an elongation of about 440–560%. Polymer binders based on a copolymer of from 70 to 95, in particular from 75 to 90, % by weight of vinyl chloride and from 5 to 30, in particular from 10 to 25, % by weight of an alkyl ester of an olefinically unsaturated carboxylic acid of 3 to 5 carbon atoms, such as acrylic acid, methacrylic acid or maleic acid, where alkyl is preferably of 1 to 3 carbon atoms, have also proven useful. The corresponding vinyl chloride copolymers with one or more $C_1$-$C_3$-dialkyl maleates, such as copolymers of from 70 to 90% by weight of vinyl chloride, from 5 to 15% by weight of dimethyl maleate and from 5 to 15% by weight of diethyl maleate, are noteworthy in this context. The K value according to H. Fikentscher is from 40 to 60 for the particularly suitable polymer binders.

Compared with the known recording media containing chromium dioxide, the magnetic recording media produced using the chromium dioxides prepared according to the invention possess improved sensitivity and maximum output level at both short and long wavelengths coupled with adequate stability under conditions of high temperature and humidity.

The Examples which follow illustrate the novel process, which is related to the prior art by comparative experiments. The magnetic properties of the powder samples were measured using a vibrating sample magnetometer in a magnetic field of 160 kA/m or in a vibrating sample magnetometer after biassing in a discharge capacitor. The coercive forces, $H_c$, measured in [kA/m], were based on a tap density $\rho$ of 1.3 g/cm$^3$ in the case of the powder measurements. The specific remanence ($M_r/\rho$) and the saturation magnetization ($M_m/\rho$) are each stated in [nTm$^3$/g]. The specific surface area $S_{N2}$ of the pigments is determined by the BET method and state in m$^2$/g, ie. nitrogen is adsorbed onto weighed evacuated gas-free pigment samples. The difference in the amount of nitrogen before and after adsorption is converted to the occupied area and expressed as a ratio of the sample weight.

For the magnetic recording media, the surface smoothness of the magnetic layer was measured both by means of a gloss measurement using a conventional reflectometer at an angle of incidence of 85° and of 20° (see, inter alia, W. Lehmann, Farb- und Glanzmessgeräte, Kontrolle, July 1984, pages 64–66) and by measuring the average peak-to-valley height $R_z$ according to DIN 4768. The stability under conditions of high temperature and humidity was determined at 65° C. and 95% relative humidity; to do this, the magnetic recording medium was stored for 14 days under these conditions in a conditioned chamber, and the residual magnetization was then measured at room temperature. The $M_r$ value ($M_r(t)$) measured after the environmental test is expressed as a ratio of the initial value ($M_r(o)$). The magnetic properties are determined using a vibrating sample magnetometer, at a magnetic field of 160 kA/m. The coercive force $H_c$ is measured in [kA/m] and the residual magnetization $M_r$ and the saturation magnetization $M_s$ are measured in [mT], and the orientation ratio Rf is calculated as the quotient of the residual induction in the magnetically preferred direction to that in the crosswise direction. The electroacoustic properties of the magnetic recording media were determined according to DIN 45,512, sheet II, with reference to standard tape IEC II.

EXAMPLE 1

A chromium dioxide prepared as described in Example 1 of EP-B No. 27 640 was dried in the air at 120° C. (sample 1). the chromium dioxide was prepared according to Example 1 as follows:

"2.25 liters of water are introduced into a reaction vessel having a capacity of 4 liters. 5.6 kg of chromium trioxide ($CrO_3$) are added, whilst stirring. After 10 minutes, 11.94 g (i.e. 0.15% by weight, based on chromium dioxide) of antimony(III) oxide (containing 98% by weight of senarmontite and having a specific surface area of 3.2 m²/g and 23.88 g (0.30% by weight, based on chromium dioxide) of acicular gamms-$Fe_2O_3$ are added. 2.88 kg of chromium(III) oxide are then introduced, with constant stirring. After further stirring for 20 minutes, the reaction vessel is fitted into an autoclave and the latter is heated at 270° C. for 15 hours. This results in the formation of chromium dioxide. As a result of the oxygen additionally produced, the pressure rises and when it reaches 450 bar is kept constant by a relief valve. After a temperature/pressure cycle of 270° C. and 450 bar for 15 hours the reactor is cooled over 8 hours, let down and opened. The chromium dioxide formed is mechanically removed from the reactor, and milled. It is then suspended in water which contains dissolved iron(II) sulfate in such amount that 2% by weight of the acicular $CrO_2$ is reduced to chromium-(III) oxide, this reduction taking place on the surface of the needles. After a residence time of 60 minutes, with stirring, the chromium dioxide suspension is filtered, and the soluble components are removed by washing."

The material was then suspended, in a ratio of 1:10, in a 13% strength solution of sodium sulfite in water, and, after 30 minutes at room temperature, was filtered off, washed with water and spray-dried (sample 2).

20 parts of sample 2, which had a BET value of 26 m²/g, were heated in each case in a rotary tube furnace in a stream of nitrogen at the temperatures stated in Table 1 (samples 3–7). For comparison, a sample was also heated in a stream of air (sample 8). The results for the measurements are shown in Table 1.

TABLE 1

| Sample No. | Heating at/in | $H_c$ | $M_r$ | $M_s$ | $CrO_2(110)$ | CrOOH (110) | Additional line |
|---|---|---|---|---|---|---|---|
| 1 | | 40 | 48 | 89 | + | weak | — |
| 2 | | 41 | 41 | 76 | + | + | + |
| 3 | 120° C./$N_2$ | 42 | 42 | 77 | + | + | + |
| 4 | 160° C./$N_2$ | 42 | 44 | 81 | + | + | + |
| 5 | 210° C./$N_2$ | 41 | 44 | 81 | + | + | — |
| 6 | 280° C./$N_2$ | 39 | 44 | 81 | + | + | — |
| 7 | 340° C./$N_2$ | 34 | 40 | 75 | + | weak | — |
| 8 | 280° C./air | 39 | 50 | 91 | + | — | — |

EXAMPLE 2

A chromium dioxide prepared as described in Example 1 of EP-B 27 640 but doped with 1.3% by weight of iron oxide was dried at 120° C. under nitrogen (sample 9). It was then treated for 2 hours in a stirred vessel at 90° C. in an aqueous suspension in the presence of 10% by weight of sodium sulfite, after which the suspension was filtered and the residue washed with water and dried in the course of 15 hours under reduced pressure from a waterpump (sample 10).

100 parts of sample 10, which had a BET value of 30 m²/g, were heated in each case in a rotary tube furnace in a stream of nitrogen at the temperatures stated in Table 2 and for the duration stated in this table (samples 11 to 14). The results of the measurements are shown in Table 2.

TABLE 2

| Sample No. | Heating at | $H_c$ | $M_r$ | $M_s$ | $CrO_2$ (110) | CrOOH (110) | Additional line |
|---|---|---|---|---|---|---|---|
| 9 | | 50 | 48 | 83 | + | + | — |
| 10 | | 51 | 41 | 71 | + | + | + |
| 11 | 280° C./180 min | 47 | 39 | 71 | + | + | — |
| 12 | 240° C./180 min | 49 | 43 | 77 | + | + | — |
| 13 | 210° C./180 min | 49 | 44 | 77 | + | + | — |
| 14 | 280° C./60 min | 48 | 41 | 72 | + | + | — |

EXAMPLE 3

40 parts of the chromium dioxide samples stated in Table 3, 175 parts of a 13% strength solution of a thermoplastic polyester urethane, obtained from adipic acid, butane-1,4-diol and 4,4'-diisocyanatodiphenylmethane, in a mixture of equal amounts of tetrahydrofuran and dioxane, 150 parts of a 13% strength solution of a commercial polyvinylformal in a mixture of equal amounts of tetrahydrofuran and dioxane, 24 parts of a solvent mixture consisting of equal amounts of tetrahydrofuran and dioxane, and 1 part of zinc oleate were mixed, and dispersed for 4 hours, these steps being carried out in a mill having a capacity of 250 parts by volume and containing 100 parts by volume of steel balls of 1.5 mm diameter. The same amounts of the two binder solutions, 13.5 parts of the stated solvent mixture and 0.1 part of a commercial silicone oil were then added, and dispersing was continued for a further 30 minutes. Thereafter, the dispersion was filtered and applied onto a 10 μm thick polyethylene terephthalate film on a conventional coating apparatus by means of a knife coater in a thickness such that a dry layer 5.5 μm thick was obtained after drying and calendering. Directly after the liquid dispersion had been cast, the acicular chromium dioxide particles were oriented along the recording direction by a magnetic field. The average peak-to-valley height $R_z$ and the gloss were determined for the surface of the magnetic layer both before and after calendering.

The results of the measurements are shown in Table 3.

TABLE 3

| | $CrO_2$ sample No. | | | | |
|---|---|---|---|---|---|
| | 10 | 11 | 12 | 13 | 14 |
| $H_c$ | 50 | 47 | 49 | 49 | 48 |
| $M_r$ | 148 | 157 | 159 | 161 | 159 |
| Rf | 2.6 | 2.9 | 3.1 | 3.0 | 3.0 |
| Gloss, uncalendered, 85° | 88 | 97 | 97 | 95 | 95 |
| calendered 20° | 106 | 216 | 220 | 216 | 200 |
| $R_z$ uncalendered | 1.07 | 0.48 | 0.45 | 0.46 | 0.46 |
| Sensitivity at long wavelengths $E_T$ | −3.1 | 0 | −0.5 | −0.5 | −0.5 |
| Sensitivity at short wavelengths $E_H$ | +2.4 | +3.7 | +4.0 | +4.0 | +4.0 |
| Maximum output level at long wavelengths $A_T$ | −1.7 | +0.5 | −0.5 | −0.5 | −0.5 |
| Maximum output level at short wavelengths $A_H$ | +3.0 | +3.5 | +5.2 | +5.2 | +5.0 |

We claim:
1. A process for preparing ferromagnetic chromium dioxide, which ferromagnetic chromium dioxide has improved residual magnetization and a better orienta- tion ratio when incorporated into magnetic recording media, which process comprises:

- reacting oxides of 3-valent and 6-valent chromium under a pressure of from 100 to 700 bar at a temperature of from 200° to 600° C. in the presence of water and in the presence of antimony(III) oxide and iron oxide as modifiers to form chromium dioxide, and thereafter (1) treating the so formed chromium dioxide in an aqueous suspension with sodium sulfite;
(2) filtering, washing and drying the so treated chromium dioxide; and
(3) heating the treated chromium dioxide at from 210° to 280° C. for from 30 minutes to 6 hours in an inert gas atmosphere, with the proviso that the resulting heated material consists only of the crystalline phases of chromium dioxide and of orthorhombic CrOOH.

* * * * *